Dec. 4, 1928.  B. C. VON PLATEN ET AL  1,693,970
REFRIGERATING APPARATUS
Filed June 22, 1926   2 Sheets-Sheet 1
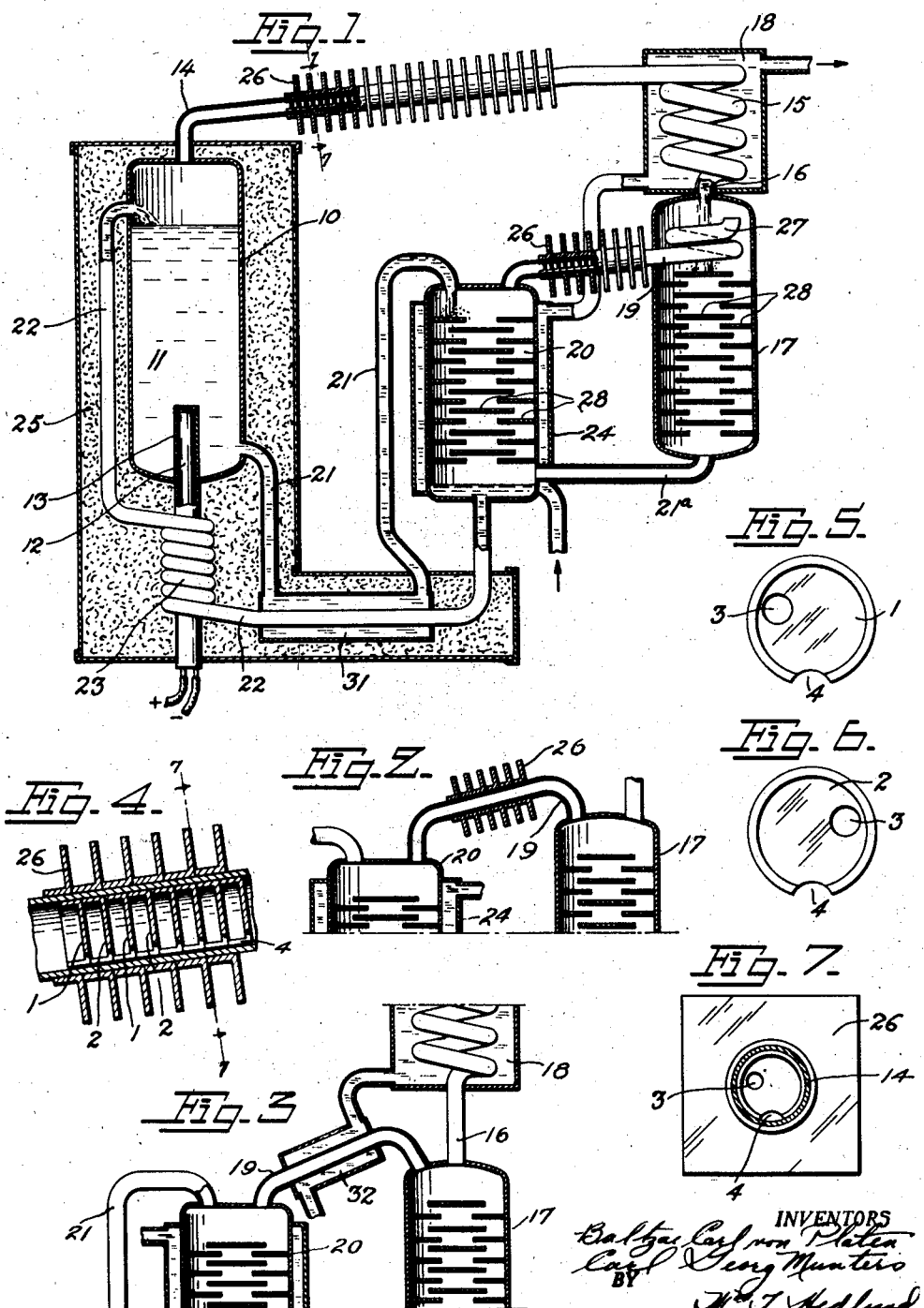
INVENTORS
Baltzar Carl von Platen
Carl Georg Munters
BY
their ATTORNEY Dec. 4, 1928.  1,693,970
B. C. VON PLATEN ET AL
REFRIGERATING APPARATUS
Filed June 22, 1926   2 Sheets-Sheet 2
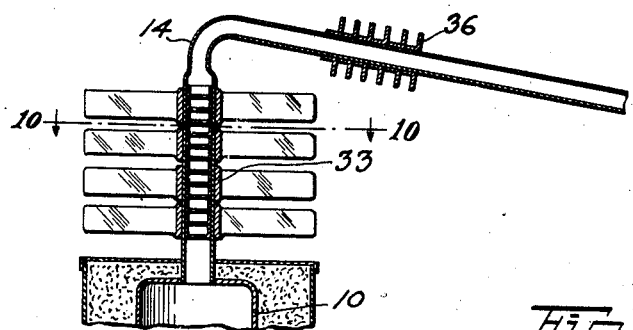
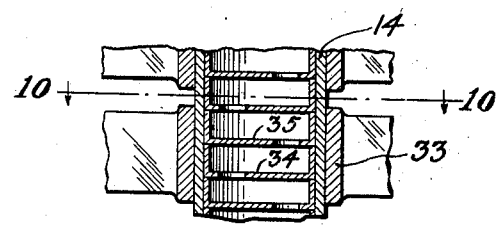
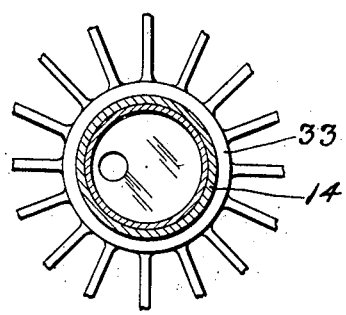
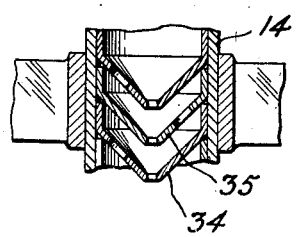
INVENTORS
Baltzar Carl von Platen
Carl Georg Munters
BY
Wm. F. Hedlund
Their ATTORNEY Patented Dec. 4, 1928.

1,693,970

UNITED STATES PATENT OFFICE.

BALTZAR CARL von PLATEN AND CARL GEORG MUNTERS, OF STOCKHOLM, SWEDEN, ASSIGNORS TO ELECTROLUX SERVEL CORPORATION, OF NEW YORK, N. Y., A CORPORATION OF DELAWARE.

REFRIGERATING APPARATUS.

Application filed June 22, 1926, Serial No. 117,701, and in Sweden July 13, 1925.

Our invention relates to absorption refrigerating apparatus and more particularly to that type of absorption refrigerating apparatus wherein a constant or substantially constant pressure is maintained throughout by the complementary diffusion of gases.

One object of our invention is to prevent absorbing vapor from entering that portion of the apparatus which abstracts heat from the surroundings for the direct production of refrigeration which is herein termed an evaporator. This vapor may come to the evaporator from either that part of the apparatus which is known as the generator or that part of the apparatus which is known as the absorber or it may enter into the evaporator from both of these parts.

Another object of our invention is to condense vapor of the absorption liquid in its passage from either the generator or the absorber or both and to cause the absorption liquid thus condensed to return into that receptacle from which it began its passage toward the evaporator.

A further object of our invention is to provide apparatus and method for limiting the pressure to which the refrigerating apparatus may rise. In this feature of our invention it provides a safety arrangement such that even though all cooling means for the refrigerating apparatus should cease to function, the pressure in the apparatus due to heat applied thereto will not rise above a predetermined value which can be determined within the safety limits of the materials of which the refrigerating apparatus is manufactured.

Further we combine this pressure limiting effect with the previously mentioned condensing effect in a manner such that a simple and highly efficient apparatus is produced.

The accompanying drawing shows several embodiments of our invention: Fig. 1 shows, more or less diagrammatically, a refrigerating apparatus of the constant pressure absorption type constructed and arranged in accordance with our invention; Fig. 2 shows a modification of our invention as applied to a portion of the apparatus of Fig. 1; Fig. 3 is still a further modification wherein a water cooling jacket is used; Fig. 4 is a cross-sectional view of a portion of the apparatus shown in Fig. 1; Figs. 5 and 6 are views of adjacent disks used in connection with the apparatus of Fig. 1; Fig. 7 is a view taken on line 7—7 Fig. 1, and line 7—7, Fig. 4; Fig. 8 shows a modified arrangement embodying the invention having a different fin and conduit arrangement; Fig. 9 is an enlarged section of part of the structure shown in Fig. 8; Fig. 10 is a section taken on line 10—10, Fig. 9; and Fig. 11 is a modified form of the arrangement shown in Fig. 9.

In Fig. 1, 10 designates a generator containing absorption liquid 11. The absorption liquid holds a refrigerant or cooling agent, for example ammonia, in solution. The generator is heated by means of an electric heating element 12 which extends within a pocket 13 firmly secured to the main portion of the generator shell. Ammonia vapor is expelled from solution in the generator and flows through conduit 14 into a condenser 15 in which it is condensed and the condensate flows from the condenser through conduit 16 and into the evaporator 17. The condenser comprises in part a cooling jacket 18 through which cold water is circulated.

As the evaporator 17 is supplied with liquid ammonia, it is simultaneously supplied with an auxiliary agent such as hydrogen. This auxiliary agent enters the evaporator from conduit 19 which is connected with absorber 20. The ammonia evaporates in the evaporator by diffusing into the hydrogen and, in evaporating, absorbs heat from the surroundings of the evaporator, thus producing refrigeration. The mixture of ammonia vapor and hydrogen thus produced passes downwardly through the evaporator and through conduit 21ª into the lower part of absorber 20.

Weak absorption liquid is supplied to the absorber through conduit 21. This absorption liquid, which when used with hydrogen and ammonia may be water, absorbs the ammonia but not the hydrogen. Strong absorption liquid saturated with ammonia leaves the bottom part of the absorber and passes through conduit 22, a part of which is formed as a coil 23 surrounding the heating element 12 and heated thereby, and into the upper part of the generator. A higher level of liquid is maintained in the generator than in the absorber due to the application of heat to coil 23 and liquid flows from the generator to the absorber due to gravity.

Hydrogen gas being very much lighter than ammonia gas, there is produced a circulation upwardly within the absorber through conduit 19, downwardly through the evaporator and back to the absorber due to difference in specific weights of the substances used.

The absorption of ammonia gas in the absorber gives off heat which is carried away by means of cooling jacket 24. Cooling jackets 24 and 18 are connected. In order to avoid heat losses, generator 10, coil 23 and a portion of conduits 21 and 22 are surrounded by heat insulating material 25, as indicated on the drawing. The evaporator and the absorber are provided with tray baffling members 28 which serve to provide a large surface for evaporation and absorption.

Conduits 21 and 22 are arranged in part to form a heat exchanger 31, the purpose of which is to transfer heat from the weak absorption liquid to the strong absorption liquid.

In apparatus of this type or of similar types it is highly desirable that no vapor of the absorption liquid should pass into the evaporator since such vapor becomes an absorbent for the cooling agent and decreases the efficiency of the evaporation. It has been found that it requires the admission of only a relatively small amount of vapor of the absorption liquid into the evaporator to considerably decrease the cooling effect of the apparatus.

In order to prevent introduction of absorption liquid into the evaporator from the generator the conduit 14 leading from the generator to condenser 15 is arranged in heat transfer relation with a cooling agent of such characteristic that vapor of the absorption liquid, in the instant case water, is condensed and the pipe is further so arranged that the condensate runs back into the generator. That this effect can be accomplished without great difficulty is apparent from the fact that the absorption liquid must have a lower boiling point than the cooling agent. At a certain total pressure in the apparatus the vapor of the absorption liquid will therefore condense at a higher temperature than the vapor of the cooling agent. It is therefore a distinct advantage to use a different cooling medium for the vapors of the absorption liquid, and preferably one of higher temperature, from that used for the vapor of cooling agent as the risk for condensation of some of the vapors of the cooling agent in the condenser for the vapors of the absorption liquid is thereby considerably decreased. If water is used as a cooling medium for the cooling agent it is, therefore, usually preferable to use atmospheric air for condensing the vapors of the absorption liquid.

The condenser for the vapor of the absorption liquid shown in Fig. 1 comprises a series of flanged collars or disk rings with collars attached, which collars are pressed or shrunk on to conduit 14. These flanged collars are indicated by reference character 26. The arrangement is clearly shown in Fig. 4. This series of flanged collars constitute heat radiating fins and may obviously have a variety of shapes, the principal features consisting in the formation of a large heat radiating surface and good contact with conduit 14. The cooler or condenser formed by this series of fins is exposed to the atmosphere and atmospheric air thus condenses the vapor of absorption liquid which may have been entrained with the vaporized ammonia and the condensed absorption liquid flows back through the inclined pipe into the generator. In order to decrease the speed of the vapor in that portion of conduit 14 which is surrounded by the heat radiating fins, in order to increase the condensing effect, there are inserted within conduit 14, in that portion, a series of baffling disks 1 and 2 (see Figs. 5 and 6) which are also preferably provided with collars pressed or shrunk on to the inner conduit surface. Each of these disks has an aperture 3, the apertures of alternate disks being located on opposite sides of the conduit so that with the apparatus assembled, a tortuous path of flow for the vapor is produced, as a result of which there is obtained an improved condensing effect. Both disks 1 and disks 2 are recessed in their lower portions, as shown at 4 in Figs. 5 and 6, said recesses forming a passageway for the condensed vapor of the absorption liquid leading back to the generator.

Another embodiment of the condenser for the vapor of the absorption liquid shown in Fig. 8 comprises a number of collars 33 with radially arranged vertical flanges suitably attached to or preferably cast in one piece with the collars, which collars are pressed or shrunk on to a vertical portion of conduit 14. The arrangement is clearly shown in Figs. 9, 10 and 11. The baffling disks 34 and 35 may have the shape shown in Fig. 9 or it may be preferred to give them a conical shape as shown in Fig. 11, in order to facilitate the flow of the liquid back to the generator.

Conduit 19 connecting the upper part of the absorber with the upper part of the evaporator is inclined and arranged to form a condenser for vapor of absorption liquid which might be entrained with the hydrogen passing from the upper part of the absorber to the evaporator. We have shown this conduit surrounded by heat radiating fins 26 and also as extending within the evaporator in the form of a coil 27 both of which arrangements serve to condense vapor, it being obvious however that either one of these arrangements may be used alone. The coil 27 constitutes a condenser due to the low temperature of the surrounding space within the evaporator. When using fins 26 on conduit 19 it is preferred to use a flow retarding means within the conduit, which flow retarding means may be the same as that shown in Fig. 4.

Besides serving the purpose of condensing vaporized absorption liquid, the heat radiating fins serve to limit the maximum pressure to which the refrigerator can rise. Obviously the maximum pressure will be obtained if the supply of heat is maintained while the cooling liquid for the absorber and the condenser is shut off. If the supply of cooling water should accidentally stop and the heat should continue to vaporize ammonia in the generator, condenser 18 would no longer be a condenser and the whole apparatus would become a vapor generator of continuously rising pressure. It is desirable that there should be a limit to the increase of pressure beyond which a rise should not take place. The total area of these fins exposed to the atmosphere together with the area of all other parts of the apparatus through which heat will be transmitted to the atmosphere serve to realize this purpose. To determine the total heat radiation surface needed in this connection we make use of the following formula:

$$Q = k \cdot Y(t_1 - t_2).$$

In this formula:

Q represents the quantity of heat supplied to the refrigerating apparatus by means of element 12 or any other heat supply used.

$k$ represents a constant which is the coefficient of conduction of heat. This constant is known for the conditions herein dealt with and is a matter of ready determination.

Y represents the surface of the apparatus which is exposed to the atmosphere. A major portion of this surface is that of the fins.

$t_1$ is the temperature corresponding to the pressure of saturated cooling agent, in the instant case the pressure of saturated ammonia which is predetermined as that limit above which pressure shall not rise.

$t_2$ represents the temperature of the atmosphere and should be calculated for that temperature which is the highest at which the refrigerating apparatus will operate.

Having given the maximum limit pressure, the factor $t_1$ can be readily calculated from a vapor diagram or by other wellknown thermo-dynamic data. Knowing the values of Q, $k$ and $t_2$, the above equation can be solved to give Y. Having found Y to be a given number of square inches or square feet it is a matter of mathematical calculation to determine how many fins are needed, taking into consideration that portion of the apparatus without the fins through which heat is also radiated. The apparatus being supplied with the number of fins thus determined, the pressure in the refrigerating apparatus cannot rise above the predetermined pressure used for solving the equation. Taking into consideration the strength of the materials used in the manufacture of the apparatus, a limit safety pressure can be predetermined which will fall so far within the limits of stress of the material used that there never can be any danger of rupture or explosion of the apparatus.

The number of fins determined in this way may be found to be unnecessarily large for the condensation of the vapors of the absorption liquid and even so large that under certain conditions part of the ammonia vapors could be expected to condense in conduit 14 and flow back to the generator which of course would mean a loss in energy. In order to avoid this the excess in heat radiating surface above that needed for condensation of the vapor of the absorption liquid may be arranged as fins 36, Fig. 8, on a part of conduit 14 which is inclined towards the condenser 15. With this arrangement a condensation of ammonia vapor by air does not mean a loss as the condensed ammonia will flow to the condenser 15.

The safety arrangement thus evolved has been made the subject matter of practical test and there has been found that at a constant supply of heat and with a certain number of disks of a given unit area the temperature and pressure will rise to a given level and no further rise is possible.

One apparatus was tested as follows:

The apparatus was arranged without insulation and was filled with the proper solution of ammonia in water and with hydrogen to a pressure of 9 kg. per cm$^2$ absolute (about 110 lbs. per sq. in. gage) and was started as usual. The pressure was tested by means of a pressure gage which was retained on the apparatus throughout the test. The apparatus functioned normally at a pressure of 12.5 kg. per cm$^2$ absolute (about 160 lbs. per sq. in. gage). The cooling water for the jackets surounding the absorber and the condenser was then shut off and the pressure rose to 18 kg. per cm$^2$ (about 240 lbs. per sq. in. gage). This last pressure proved to represent equilibrium. The apparatus was kept under these conditions of heat applied but without heat extraction for twelve hours. The generator and heat exchanger were then insulated but the evaporator was kept uninsulated. The pressure then rose to a new equilibrium of 23 kg. per cm$^2$ absolute (about 310 lbs. per sq. in. gage). The temperature in the generator increased to 122° C. (about 252° F.) normal temperature. The temperature of the evaporator rose to 50° C. (122° F.). The supply of electric current was measured and found to be 290 watts. After the apparatus had operated in this way for twelve hours, the cooling water was again turned on whereupon, judging from the accumulation of frost on the evaporator, the apparatus resumed its normal functioning in a few minutes.

Fig. 2 shows an arrangement wherein fins are provided on conduit 19 but this conduit is not extended within the evaporator. In this embodiment the flow retarding baffling members are omitted.

In the modification shown in Fig. 3 the conduit 19, extending between the absorber and the evaporator, is provided with a cooling jacket 32 which is interconnected with the cooling jacket 18. This arrangement is obviously not intended as a pressure limiting device but in the use of a cooling jacket around conduit 19 it is intended that the limiting heat retarding surface be determined wholly by the number of disk rings or fins applied to conduit 14.

The heat radiating fins may be used on conduit 14 and all cooling means omitted from conduit 19.

While we have limited our description down to two preferred embodiments with some modifications thereof, it will be obvious to those skilled in the art that various other modifications may be readily evolved which fall within the spirit and scope of the invention.

Having thus described our invention what we claim is:—

1. Refrigerating apparatus of the constant pressure absorption type comprising a generator containing a cooling agent dissolved in absorption liquid, a condenser, an evaporator, an absorber, a conduit extending upwardly from said generator to said condenser, and means for providing radiating surface for limiting the maximum pressure to which the apparatus can rise and for condensing vapor of absorption liquid in said conduit comprising a series of air cooling fins surrounding said conduit.

2. Refrigerating apparatus of the constant pressure absorption type comprising a generator containing a cooling agent dissolved in absorption liquid, a condenser, an evaporator, an absorber, a conduit extending upwardly from said generator to said condenser and means for providing radiating surface for limiting the maximum pressure to which the apparatus can rise and for condensing vapor of absorption liquid in said conduit comprising an irregular heat radiating surface of large area surrounding said conduit.

3. Refrigerating apparatus of the constant pressure absorption type comprising a generator containing a cooling agent dissolved in absorption liquid, a condenser, an evaporator, an absorber, a conduit extending substantially horizontally from said generator to said condenser but inclined slightly upwardly from said generator, and means for providing radiating surface for limiting the maximum pressure to which the apparatus can rise and for condensing vapor of absorption liquid in said conduit comprising a series of members projecting from the surface of said conduit to afford a large heat radiating surface.

4. Refrigerating apparatus comprising a generator containing a cooling agent dissolved in absorption liquid, a condenser, means for cooling said condenser by water, a conduit extending upwardly from said generator to said condenser, and means for providing radiating surface for limiting the maximum pressure to which the apparatus can rise and for condensing vapor of absorption liquid in said conduit comprising a series of members projecting outwardly from said conduit into the atmosphere to afford a large heat radiating surface.

5. Refrigerating apparatus of the constant pressure absorption type comprising a generator containing a cooling agent dissolved in absorption liquid, a condenser, an evaporator, an absorber, an inclined conduit extending upwardly from said generator to said condenser, and means for providing radiating surface for limiting the maximum pressure to which the apparatus can rise and for condensing vapor of absorption liquid in said conduit comprising a series of air cooling flanged collars shrunk onto said conduit.

6. Refrigerating apparatus of the constant pressure absorption type comprising a generator, a condenser, an evaporator, an absorber, a substantially horizontally extending conduit extending upwardly from said generator to said condenser, a series of baffling members in said conduit arranged to form a tortuous path through said conduit, and a plurality of members projecting from said conduit opposite the inside baffling members to afford a large heat radiating surface.

7. Refrigerating apparatus of the constant pressure absorption type comprising a generator, a condenser, an evaporator, an absorber, a conduit extending upwardly from said generator to said condenser and a condenser surrounding said conduit, said condenser comprising a series of flanged collars shrunk into said conduit, said flanged collars having sufficient surface to limit the maximum pressure of the refrigerating apparatus to within the limitation of stress of the material used.

8. Refrigerating apparatus of the absorption type comprising a vessel containing absorption liquid, an evaporator, a conduit extending upwardly from said vessel towards said evaporator, and means for providing radiating surface for limiting the maximum pressure to which the apparatus can rise and for condensing vapor of absorption liquid in said conduit comprising a plurality of members extending outwardly from said conduit to form a large heat radiating surface.

9. Refrigerating apparatus of the absorption type comprising a vessel containing absorption liquid, an evaporator, a horizontally inclined conduit extending upwardly from said vessel toward said evaporator and means for providing radiating surface for limiting the maximum pressure to which the apparatus can rise and for condensing vapor of absorption liquid in said conduit comprising a series of fins providing a large heat radiating surface.

10. Refrigerating apparatus of the absorption type comprising a vessel containing absorption liquid, an evaporator, a conduit extending upwardly from said vessel toward said evaporator, baffling means within said conduit to form a tortuous path of flow, means to allow condensed liquid to flow back through said conduit to said vessel, a series of members projecting outwardly from said conduit to form a large heat radiating surface arranged to be cooled by air and to form a condenser for fluid within the conduit, a downwardly extending conduit connected to the upper part of the upwardly extending conduit and means to cool the downwardly extending conduit by water.

11. Refrigerating apparatus of the constant pressure absorption type comprising a vessel containing absorption liquid, an evaporator, a substantially horizontal conduit extending upwardly from said vessel toward said evaporator, a series of baffling members arranged to form a tortuous path through said conduit, a series of fins on the outside of said conduit arranged to be cooled by air, said fins having sufficient surface to limit the pressure in the refrigerating apparatus to a predetermined value within the limits of stress of the material of which the refrigerating apparatus is manufactured.

12. Refrigerating apparatus of the absorption type comprising, in series, a generator containing an absorption liquid and having a cooling agent dissolved therein, a condenser in which the vapor of the cooling agent is condensed, an evaporator in which the condensed cooling agent evaporates while extracting heat from the surroundings, an absorber in which the vaporized cooling agent is again absorbed by the absorption liquid and from which it is conducted back to the generator, a conduit extending from said generator to said condenser, part of said conduit being inclined from the horizontal and extending downwardly towards the generator, condensing means in heat transfer relation with the inclined part of the conduit and means for circulating an auxiliary agent adapted to have complementary diffusion with the cooling agent between and through the absorber and evaporator.

13. Refrigerating apparatus of the absorption type comprising, in series, a generator containing an absorption liquid having a cooling agent dissolved therein, a condenser in which the vapor of the cooling agent is condensed, an evaporator in which the condensed cooling agent evaporates while extracting heat from the surroundings, an absorber in which the vaporized cooling agent is again absorbed by the absorption liquid and from which it is conducted back to the generator, said evaporator and said absorber containing an auxiliary agent circulating therebetween, a conduit extending from said absorber to said evaporator for conducting said auxiliary agent from the absorber to the evaporator, a part of said conduit being inclined towards the absorber and means for condensing vapor of the absorption liquid in said conduit.

14. Refrigerating apparatus of the absorption type comprising, in series, a generator containing an absorption liquid and having a cooling agent dissolved therein, a condenser in which the vapor of the cooling agent is condensed, an evaporator in which the condensed cooling agent evaporates while extracting heat from the surroundings, an absorber in which the vaporized cooling agent is again absorbed by the absorption liquid and from which it is conducted back to the generator, said evaporator and absorber containing an auxiliary agent, a conduit extending from said absorber to said evaporator and conducting said auxiliary agent from the absorber to the evaporator, said conduit being inclined toward the absorber and extending within the evaporator, the end of the conduit extending within the evaporator being coil-shaped.

15. Refrigerating apparatus of the absorption type comprising, in series, a generator containing an absorption liquid having a cooling agent dissolved therein, a condenser in which the vapor of the cooling agent is condensed, an evaporator in which the condensed cooling agent evaporates while extracting heat from the surroundings, an absorber in which the vaporized cooling agent is again absorbed by the absorption liquid and from which it is conducted back to the generator, a substantially horizontal conduit extending from said generator toward said evaporator, said conduit being inclined from the horizontal downwardly towards the generator, a series of heat radiating members of large surface extending outwardly from the inclined conduit and baffling members inserted in the inclined conduit opposite the heat radiating members for decreasing the velocity of flow of gases therethrough, said baffling members being arranged to form a return passageway for liquid to the generator and said series of heat radiating members being of sufficient surface to limit the maximum allowable pressure within the apparatus.

16. Refrigerating apparatus of the absorption type comprising, in series, a generator containing an absorption liquid having a cooling agent dissolved therein, a condenser in which the vapor of the cooling agent is condensed, an evaporator in which the condensed cooling agent evaporates while absorbing heat from the surroundings, an absorber in which the vaporized cooling agent is again absorbed by the absorption liquid and from which it is conducted back to the generator, an inert gas being contained in said apparatus, a conduit extending from said absorber to said evaporator and conducting the said inert gas from the absorber to the evaporator, said conduit being inclined toward the absorber, condensing means disposed in heat transfer relation with said inclined conduit and baffling members inserted in said conduit for decreasing the velocity of flow through said conduit.

17. Refrigerating apparatus of the absorption type comprising, in series, a generator containing an absorption liquid having a cooling agent dissolved therein, a condenser in which the vapor of the cooling agent is condensed, an evaporator in which the condensed cooling agent evaporates while extracting heat from the surroundings, an absorber in which the vaporized cooling agent is again absorbed by the absorption liquid and from which it is conducted back to the generator, a substantially horizontal conduit extending between said generator and said evaporator, said conduit being inclined from the horizontal towards said generator, condensing means disposed in heat transfer relation with said conduit and a plurality of perforated disks, the perforations of the several disks being arranged in staggered relationship, inserted in said conduit for decreasing velocity of flow through the same.

18. Refrigerating apparatus of the absorption type comprising, in series, a generator containing an absorption liquid having a cooling agent dissolved therein, a condenser in which the vapor of the cooling agent is condensed, an evaporator in which the condensed cooling agent evaporates while extracting heat from the surroundings, an absorber in which the vaporized cooling agent is again absorbed by the absorption liquid and from which it is conducted back to the generator, an inert gas being contained in said apparatus, a conduit extending from said absorber to said evaporator for conducting the said inert gas from the absorber to the evaporator, said conduit being inclined towards the absorber, condensing means disposed in heat exchange relation with the inclined conduit, and means inserted within the inclined conduit for decreasing the velocity of flow of gas through the same, the latter means comprising a plurality of perforated disks, the perforations of the several disks being arranged in staggered relationship, said disks being arranged to form a return passageway to said absorber for liquid condensed in said conduit.

19. Refrigerating apparatus of the constant pressure absorption type comprising a generator, a condenser, an evaporator, an absorber, a conduit extending upwardly from said generator to said condenser, a conduit extending upwardly from said absorber to said evaporator and condensing means in heat exchange relation with both of said conduits.

20. Refrigerating apparatus of the constant pressure absorption type comprising a generator, a condenser, an evaporator, an absorber, a horizontally inclined conduit extending upwardly from said generator to said condenser, a horizontally inclined conduit extending upwardly from said absorber to said evaporator, and a series of members projecting outwardly from each of said conduits to afford a large surface for heat radiation.

21. Refrigerating apparatus of the constant pressure absorption type comprising a generator, a condenser, an evaporator, an absorber, a horizontally inclined conduit extending upwardly from said generator to said condenser, a horizontally inclined conduit extending upwardly from said absorber to said evaporator, and a series of flanged collars shrunk onto the outside of each of said conduits.

22. Refrigerating apparatus of the constant pressure absorption type comprising a generator, a condenser, an evaporator, an absorber, a conduit inclined upwardly from said generator to said condenser, a conduit inclined upwardly from said absorber to said evaporator, a series of members projecting outwardly from each of said conduits to afford a large surface for heat radiation and a series of baffling members within each of said conduits to provide a tortuous path of flow therethrough, said baffling members being arranged to form return passageways in said conduits to said generator and said absorber.

23. Refrigerating apparatus of the absorption type comprising, in series, a generator containing an absorption liquid and having a cooling agent dissolved therein, a condenser in which the vapor of the cooling agent is condensed, an evaporator in which the condensed cooling agent evaporates while extracting heat from the surroundings, an absorber in which the vaporized cooling agent is again absorbed by the absorption liquid and from which it is conducted back to the generator, connections whereby a circuit of circulation is formed including said absorber and said evaporator and means for preventing vapor of said absorption liquid from entering into said evaporator both from said generator and from said absorber.

24. Refrigerating apparatus comprising a generator, a condenser, an absorber, an evaporator and conduits connecting the aforementioned parts to form a closed system for circulation of fluids including a cooling agent, said system including conduits for circulating absorption liquid between the generator and absorber, and for circulating an inert gas through and between the evaporator and absorber including a conduit connected to the upper part of the absorber for conducting the inert gas therefrom to the evaporator and means extraneous to the system for cooling the last mentioned conduit.

25. That improvement in the art of refrigerating through the agency of a generator-condenser-absorber cycle employing a cooling agent and an auxiliary gas inert with respect of the cooling agent in the presence of which the cooling agent evaporates, and an absorption liquid adapted to absorb the cooling agent but not the inert gas, which consists in circulating the inert gas through the absorber and evaporator and applying a cooling fluid extraneous to the fluids of the cycle to cool the inert gas in its passage from the absorber to the evaporator.

In testimony whereof we hereunto affix our signatures.

BALTZAR CARL von PLATEN.
CARL GEORG MUNTERS.